Figure 1:
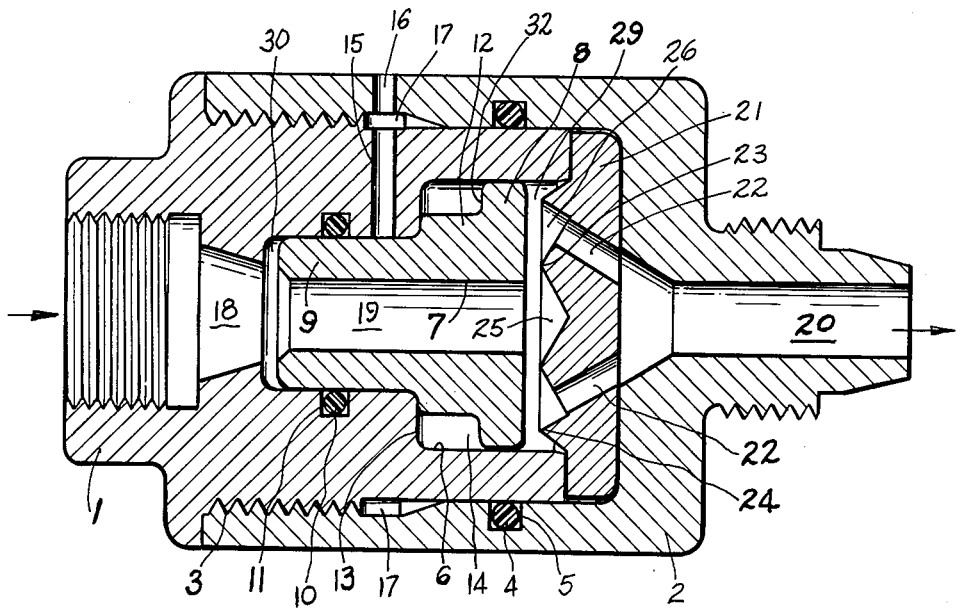

Oct. 30, 1962     H. C. FOSTER     3,060,959
EXCESS FLOW CUT-OFF VALVE

Filed July 7, 1960     2 Sheets-Sheet 1

INVENTOR:
HARRY CLARK FOSTER

BY

*John D. Wilkins*
ATTORNEY

United States Patent Office 3,060,959
Patented Oct. 30, 1962

3,060,959
EXCESS FLOW CUT-OFF VALVE
Harry Clark Foster, East Alton, Ill., assignor to Olin
Mathieson Chemical Corporation, East Alton, Ill., a
corporation of Virginia
Filed July 7, 1960, Ser. No. 41,275
4 Claims. (Cl. 137—498)

This invention relates to valves and particularly to flow cut-off valves for high pressure fluid lines.

The valves of the present invention are particularly well suited for in-line installation in high pressure fluid lines subject to sudden pressure drops. Such conditions prevail in various types of installations, but for the sake of convenience, the present valves will be described in conjunction with compressed gas blasting systems. When blasting with compressed air or the like, a compressed gas is conveyed through suitable lines to one or more blasting cartridges adapted to be discharged sequentially. One blasting system of this type is well illustrated in the pending application, Serial No. 4,348, filed January 25, 1960, by Ralph Vincent Wakefield and Harry Clark Foster. In such assemblies, the valve is positioned in the line intermediate the source of compressed gas and the point at which the line is to be vented. The valve is preferably positioned relatively close to the cartridge and in some instances can be unitary therewith.

In normal blasting operations utilizing such compressed gas cartridges, the flow of gas from the compressor to the cartridge is manually controlled. The manual control is maintained in an open position until the cartridge has discharged and then is immediately closed to avoid wasteful escape of gas from the line into the atmosphere. Thus, the operation of the conventional blasting system is completely dependent upon manual operation. While such a shortcoming is recognized and can normally be tolerated when using blasting shells having a shearable member, the problem becomes particularly acute when a number of these shells are to be fired in series when so-called automatic shells are employed. The latter shells, having no expendable parts, discharge when the compressed gas contained in their chambers reaches a predetermined pressure. Thus, if the flow of gas into the automatic cartridge is not stopped immediately after discharge of the shells, there is danger of the shell being repeatedly filled and discharged with the attendant hazards both to workmen and equipment.

It is, therefore, an object of this invention to provide a novel valve assembly overcoming the disadvantages and hazards of the prior art. Another object of this invention is to reduce operating cost by conservation of compressed gas and to insure more reliable operation of compressed gas blasting cartridges in series shooting. A more specific object is to provide a novel and improved flow cut-off valve capable of resetting itself in a minimum time.

Figure 2:
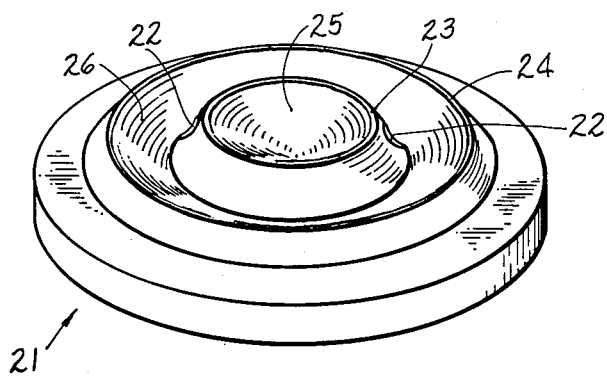
Figure 3:
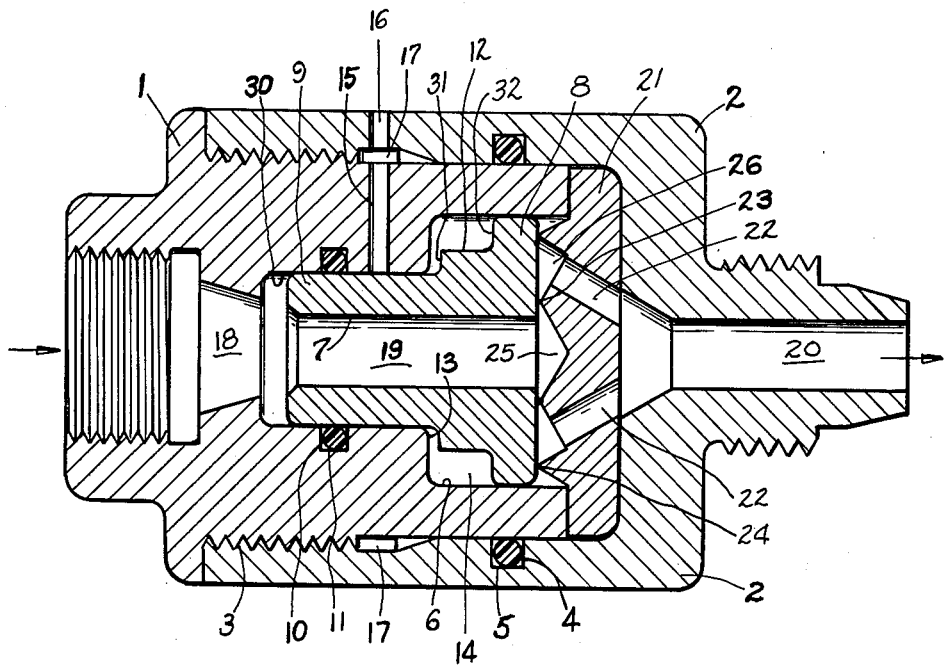

The manner in which these and other objects are accomplished will be apparent from the following specification together with the drawing wherein FIG. 1 is a longitudinal sectional view illustrating a preferred embodiment of the present invention when open; FIG. 2 is a perspective view of the valve seat member; and FIG. 3 is a sectional view of the embodiment of FIGURE 1 when closed.

As shown in the drawing, the valve assembly is provided with an inlet body 1 and an outlet cap 2 which are screw threadedly connected as indicated at 3. The seal between the inlet body 1 and outlet cap 2 is completed by resilient sealing means 4 positioned in groove 5 of the inlet body. A substantially cylindrical chamber 6 and chamber 30 of different diameters are contained within the inlet body and accommodate valve piston 7. Base portion 8 of the valve piston has a slightly smaller diameter than the larger cylindrical chamber 6 so as to provide a relatively narrow annular restriction therebetween. Stem portion 9 of the valve piston forms a sliding fit with smaller chamber 30 of the inlet body and a seal therebetween is provided by resilient means 10 in groove 11 of the inlet body. The intermediate portion 12 of the valve piston has a diameter greater than that of the stem portion and smaller than that of the base portion. The intermediate and stem portions 12 and 9 of the valve body form face 31 to cooperate with shoulder 13. Also, the intermediate portion 12 of the valve piston together with base 8 and shoulder 13 and also a portion at 6 of inlet body 1 define obturated annular chamber 14. The obturated chamber is in communication with vents 15 and 16 in seriatum with a restricted passageway between stem portion 9 of the valve body and inlet body 1. An annular chamber 17 in the outlet cap obviates the necessity of having vents 15 and 16 in perfect alignment. The assembly is so designed that inlet port 18, bore 19 in the valve piston, and outlet port 20 are for series communication and shown in substantial alignment.

The outlet port 20 is spanned by circular valve seat 21 provided with diagonal ports 22. The valve seat is maintained in position by the cooperation of the inlet body 1 and outlet cap 2 as shown. As illustrated, the valve seat has a diameter slightly less than the internal diameter of outlet cap 2. However, it will be readily appreciated that these diameters can be substantially equal so as to form a snug fit. Also, in some instances the seal between the valve seat and the base of the outlet cap can be augmented by a resilient sealing member such as O-ring positioned in a groove in either of these members. Valve seat 21 is provided with annular extensions 23 and 24, the extremities of which are coplanar. These extensions form central depression 25 and annular space 26 in the face of the valve seat. Alternately, the valve seat can be flat and the base 8 of the valve piston 7 modified to provide similar spacing between the valve piston and the valve seat.

The valve as shown in FIGURE 1 of the drawing is in the normally open position with base 8 of valve piston 7 separated from circular valve seat 21. In this position at the start of normal operation, compressed gas enters inlet body 1 through inlet port 18, passes through bore 19 of valve piston 7 to space 29, between the valve piston and the valve seat and thence through annular space 26. The compressed gas then continues through diagonal ports 22 and outlet port 20 to the cartridge being charged. Valve piston 7 will remain in the position shown during the charging of the cartridge. The device is preferably assembled with the portion 8 displaced from seat 21 to place piston valve 7 in open position and thereafter when compressed gas is first introduced into the assembly, the valve piston will necessarily and automatically assume the position as shown in the drawing in response to changing gas pressures in successive firings of the shell. This will become apparent from the following explanation.

When compressed gas is introduced into the assembly, the major portion of it passes through the valve as indicated above and the valve piston is maintained in an open position because the effective cross-sectional area of the basal portion 8 thereof proximate the outlet port 20 is considerably greater than the effective cross-sectional area of the stem portion 9 of the piston subjected to the pressure in the inlet port 18. As the passage of gas continues through the assembly, a portion of the gas passes into obturated chamber 14 through the small annular clearance between the inlet body 1 and basal portion 8 of the valve piston. Thus, the pressure within obturated chamber 14 gradually approaches and substantially reaches the line pressure. When the pressure in the obturated chamber becomes substantially equal to the line pressure, the effective cross-sectional areas including 31 and 32 determining the position of the valve piston 7 are then proportional to the relative diameters of portion 8, intermediate portion 12 and that of stem portion 9. Since the portion 12 is greater than the latter, the valve is maintained in an open position. In this connection, it should also be noted that a metal-to-metal seal between the extremity 31 of the intermediate portion 12 and shoulder 13 serves to maintain the pressure level within obturated chamber 14. When the pressure in outlet 20 is suddenly reduced as, for example, by the discharge of a compressed gas blasting cartridge connected to the outlet, the gas in obturated chamber 14 expands and acts on areas 31 and 32 forcing base 8 of valve piston 7 into contact with valve seat 21. This action is augmented by the imbalance on opposite ends of the valve piston.

With the valve thus closed, as shown in FIGURE 3, the metal-to-metal seal between intermediate portion 12 of the valve piston and shoulder 13 is broken. Under these conditions, the pressure within obturated chamber 14 is then liberated through the annular clearance space between inlet body 1 and stem portion 9 of the valve piston and thence through vent 15, annular chamber 17, and vent 16 to the atmosphere. After the pressure of the compressed gas in the cartridge or other device connected to outlet 20 has been reduced, the line pressure can be relieved by any convenient means. As the force resulting from this line pressure in inlet 18 and bore 19, acting upon the affected area of small end 9 of the piston, falls sufficiently below the force resulting from the residual pressure at outlet 20 acting upon the annular area of base 8 adjacent annular space 26 in the valve seat, the valve piston is again urged to the open position shown in the drawing. This permits relief of the residual pressure and also resets the valve for the next operating cycle. When the valve is closed, basal portion 8 of the valve piston is in sealing relationship with annular extensions 23 and 24. Thus, gas from the inlet port cannot enter obturated chamber 14 nor ports 22, nor can gas from ports 22 enter obturated chamber 14.

Piston valve 7 does not act like a check valve in the event of sudden flow but remains open in normal separation from seat 21, due at least in part to the constriction offered by ports 22.

When the effect of the residual pressure at space 26 is complete, at least a small amount of the first increment of compressed gas introduced escapes and the entire base of the valve piston is then immediately exposed to the prevailing pressure and the valve in response thereto assumes its open position.

In normal operation the valve is moved forward by expansion of compressed air in obturating chamber 14 only upon a sudden reduction of pressure at outlet 20 upon discharge. Later, it is reset to open position by the residual pressure in the discharge shell acting in annular space 26 when the pressure at inlet 18 is reduced. Once the valve is unseated, a larger unbalance of areas exposed to prevailing pressure is created to complete this opening movement of the valve piston. The valve of the present invention is particularly advantageous in that it insures exceedingly rapid and fool proof operation. This superior functioning is dependent to a great extent upon the manner in which compressed gas can be controllably contained and liberated from obturated chamber 14. Since gas can escape from the chamber toward the outlet 20 only at a relatively slow rate, the chamber cooperates in effecting substantially immediate and positive closure of the valve system. Alternately, with the valve closed, chamber 14 is very rapidly vented and reduced to a substantially lower pressure than that prevailing in the system. With the obturated chamber at a substantially lower pressure than the residual pressure of outlet 20, the valve resets itself automatically with little or no significant delay. The area of annular space 26 is greater than the effective area on the small end of the valve exposed to the inlet pressure. Therefore, the valve resets itself even when the pressure at the inlet port is greater than the pressure at the outlet port.

Although the invention has been described in considerable detail in the foregoing for the purpose of illustration, it is to be understood that such detail is solely for that purpose and that many modifications can be made without departing from the spirit and scope of the invention. For example, the seal between the valve seat and the outlet cap can be augmented by the utilization of one or more resilient O-rings or the like. Also, the configuration of the base portion of the valve piston or the valve seat can be modified so as to cooperate to form central depression 25 and annular space 26. Likewise, either or both of the resilient sealing means illustrated in the drawing can be located in either of the contiguous members and can also be strategically relocated. Numerous other modifications will readily suggest themselves to those skilled in the art.

What is claimed is:

1. A pressure responsive cut-off valve comprising a housing, a cylindrical chamber having ends of two different sizes within the housing, an inlet port at one end of the chamber, an outlet port at the opposite end of the chamber, a valve seat spanning the outlet port, a hollow valve piston having stem and base portions slidable within said ends of the chamber forming a fluid flow passage therethrough between the inlet port and the valve seat, an obturating annular chamber about the valve piston between the housing and the valve piston base portion for actuating said piston, said housing and piston forming a restriction in communication with said annular chamber, valve seat and outlet port to fluid pressurize said annular chamber, means for venting the annular chamber when the valve piston is fluid actuated to contact the valve seat, the effective cross-sectional area of the valve piston facing the inlet port subject to inlet pressure when the valve is in open position being less than the effective cross-sectional area of the valve piston facing the valve seat and subjected to outlet pressure, and said seat and piston being operative as means for altering the relationship of the effective cross-sectional areas on the ends of the valve piston when the pressure in the outlet port is suddenly reduced to seat said piston.

2. A pressure responsive cut-off valve comprising a housing, a cylindrical chamber having ends of two different sizes within the housing, an inlet port at one reduced end of the chamber, an outlet port at the opposite enlarged end of the chamber, a valve seat spanning the outlet port, a valve piston slidable within the chamber between the inlet port and the valve seat, the effective cross-sectional area of the valve piston facing the inlet port being normally less than the effective cross-sectional area of the valve piston facing the valve seat, a perforation extending through the valve piston to provide a flow path between said inlet port and said opposite end, an obturating annular space between the valve piston intermediate its ends and the surrounding housing portion of the cylindrical chamber, said obturating chamber being in indirect communication by a restriction with the inlet port to pressurize said chamber at a retarded rate whereby a sudden occurrence of differential pressure between said ports produces a reversal of the effective areas to effect contact of said piston with said seat, means for venting the chamber at a retarded rate when the valve piston is fluid actuated toward contact with the valve seat, that portion of the valve seat adjacent the valve piston being an annular edge between a centrally located circular depression and an annular space about and separated from the depression by said edge, and having a passageway communicating with the annular space and the outlet port.

3. A pressure responsive cut-off valve comprising a housing, a cylindrical chamber having ends of two different sizes within the housing, an inlet port at one end of the chamber, an outlet port at the opposite end of the chamber, a valve seat spanning the outlet port and having passageways therethrough between the cylindrical chamber and the outlet port, a valve piston slidable within the chamber between the inlet port and the valve seat, a substantially centrally positioned longitudinal perforation through the valve piston to provide a gas flow path between said inlet port and said opposite end, the effective cross-sectional area of the valve piston facing the inlet port being normally less than the effective cross-sectional area of the valve piston facing the valve seat, said cylindrical chamber being provided with areas of different diameter area, the larger diameter being adjacent the outlet port and the smaller diameter area being adjacent the inlet port, a shoulder formed in the chamber at the juncture of the differing diameters, that portion of the valve piston adjacent the outlet port having a diameter slightly less than that portion of the cylindrical chamber with the larger diameter to form a restriction so as to permit gas flow at a retarded rate therebetween, that portion of the valve piston adjacent the inlet port forming a sliding fit with the lesser diameter area of the cylindrical chamber, means for sealing said sliding fit, the median portion of the valve piston having a diameter of intermediate magnitude, an obturating annular chamber being formed between said median portion and the cylindrical housing, said median portion adapted to seal on said shoulder by actuation of said piston by gas acting on said cross sectional area facing the seat and whereby a sudden drop of pressure at the outlet port as compared to the inlet port produces at least a temporary reversal of the effective areas to effect contact of said piston with said seat, and means for venting the annular obturated chamber at a retarded rate when the valve piston is gas actuated away from said shoulder to contact with the valve seat.

4. A fluid pressure responsive normally open, flow cut-off device comprising a valve housing formed of a male member and a female member assembled disengagably to form merging chambers of different transverse sizes with an inlet means at one end at the smaller chamber and an outlet means at the opposite end at the larger chamber, said chambers being separated by an intermediate shoulder, a separate valve seat clamped between said members adjacent said outlet means having at least one dischrge port to said outlet means, a stepped piston movable between a normally opened position and a closed position, said piston being supported in said chambers and having a stem portion slidably engaged in said smaller chamber, a base portion slidably engaged in said larger chamber, a first face adjacent said inlet means exposed to inlet pressure tending to move said piston to said closed position, a second face larger than said first face adjacent said outlet means, said second face being adapted for abutment with said seat in said closed position and adapted when exposed to outlet pressure to move said piston to said open position, and said piston having a passage therethrough between said faces for fluid flow from said inlet means to said second face and valve seat, said piston having a median portion larger than said stem portion, but smaller than said base portion, said stem and median portions forming a second shoulder abuttable with said first shoulder for defining an obturating annular portion of said larger chamber between said median portion and housing and for cutting off the escape of fluid from said annular portion, and, when exposed to the pressure therein, for tending to move said piston to said closed position, said base portion being of a size slightly less than said larger chamber to form a restriction permitting fluid flow at a retarded rate from said passage to said annular portion and having an annular face in said annular portion adapted when exposed to pressure therein to move said portion to said closed position, said stem portion in said smaller chamber forming a second restriction for venting said annular portion at a retarded rate, a first vent means from said second restriction formed in said male member, a second vent means for exhausting to the outside formed in said female member, and an annular connector passage formed between said members in communication with said vent means, means between said stem portion and housing for sealing said second restriction from said inlet means, and at least one of said seat and piston at said second face providing a valve closure spaced outwardly from said piston passage and an annular space about said closure communicating with at least an outward portion of said second face and said discharge port.

References Cited in the file of this patent

UNITED STATES PATENTS 2,529,731  Hollerith _____ Nov. 14, 1950

FOREIGN PATENTS 839,349  Great Britain _____ June 29, 1960